(No Model.)
G. JURICK.
CLOTHES LINE CLAMP.
No. 350,980. Patented Oct. 19, 1886.
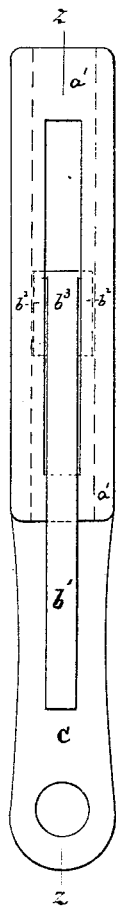
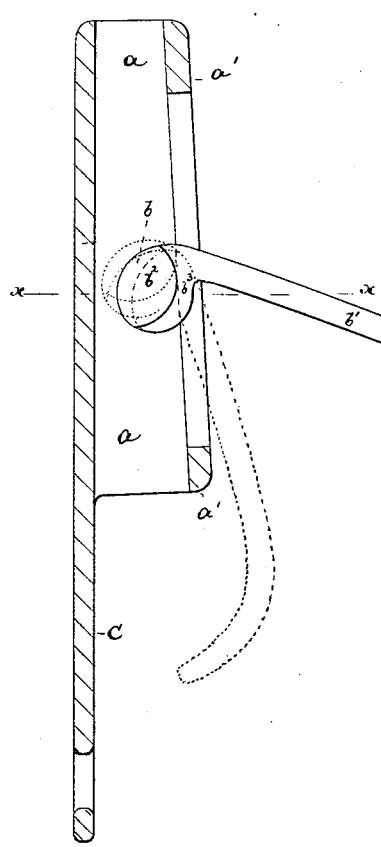
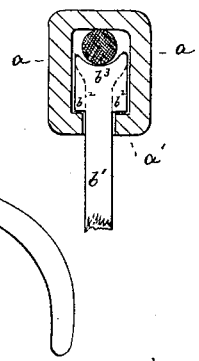
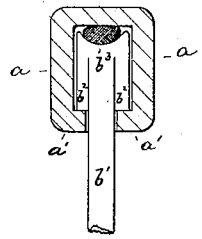
Witnesses
O. P. Stetson
Rob't H. Roy
Inventor:
G. Jurick
by his attorneys
Roeder & Briesen

UNITED STATES PATENT OFFICE.

GEORGE JURICK, OF HOBOKEN, NEW JERSEY.

CLOTHES-LINE CLAMP.

SPECIFICATION forming part of Letters Patent No. 350,930, dated October 19, 1886.

Application filed July 3, 1886. Serial No. 207,031. (No model.)

*To all whom it may concern:*

Be it known that I, GEORGE JURICK, of Hoboken, Hudson county, State of New Jersey, have invented a new and Improved Clothes-Line Clamp, of which the following specification is a full, clear, and exact description.

This invention relates to a clothes-line clamp adapted to clamp lines of different thicknesses.

The invention consists in the elements of improvement hereinafter more fully described, and pointed out in the claim.

In the accompanying drawings, Figure I is a front view of my improved clothes-line clamp. Fig. II is a longitudinal section on the line $z$ $z$, Fig. I. Fig. III is a cross-section on the line $x$ $x$, Fig. II, showing the clothes-line released. Fig. IV is a similar section showing the line clamped.

The letter $a$ represents a rectangular box or case made of wood or other material, and having a central bore open from end to end. This bore is of tapering form by the arrangement of the plate $a'$ being inclined to the back of the box, thus being contracted at one end and gradually increasing toward the other end, as shown. The top plate, $a'$, of case $a$ is provided with a long and narrow slot, Fig. I, that communicates with the central bore.

Within the case $a$ there is placed a dog or cam, $b$, having a handle, $b'$, that projects out of the slot of plate $a'$. The dog $b$ is not pivoted to the case, but is free to be moved therein backward and forward. Cheek-pieces $b^2$ on dog $b$ retain the dog within case $a$.

In use one end of a wash-line is fastened to an eye made in the prolongation or arm $c$ of the back plate projecting from one end of case $a$, while the other end is passed into the contracted end of case $a$, the dog being swung up, as in Fig. III. Next the dog is swung down, and the line on becoming taut will cause the dog to slide back within case $a$ until it has reached such a point that the line becomes tightly clamped in place, Fig. IV.

The central portion, $b^3$, of dog $b$ is grooved or made concave for the reception of the line, and is, together with the cheek-pieces $b^2$, of a width to move freely in the box $a$, while the remaining part, together with the handle $b'$, is of such a width only that it can enter the slot of plate $a'$, and thus the dog may be freely oscillated, the cheek-pieces $b^2$ retaining it within case $a$.

I claim as my invention—

The combination of tapering case $a$, having slotted front plate, $a'$, and arm $c$, with dog $b$, having cheek-pieces $b^2$, grooved central piece, $b^3$, and handle $b'$, substantially as specified.

GEORGE JURICK.

Witnesses:
F. V. BRIESEN,
ROB H. ROY.